UNITED STATES PATENT OFFICE.

JEAN A. MATHIEU, OF PHILADELPHIA, PENNSYLVANIA.

PROCESS OF MANUFACTURING CHARCOAL.

SPECIFICATION forming part of Letters Patent No. 288,716, dated November 20, 1883.

Application filed November 12, 1878.

*To all whom it may concern:*

Be it known that I, JEAN ANTOINE MATHIEU, of the city and county of Philadelphia, in the State of Pennsylvania, have invented an Improved Process of Manufacture of Charcoal and Analogous Products by Distillation or Carbonization, of which the following is a specification.

The object of my invention is to produce a charcoal very dense and heavy and free from phosphorus, arsenic, sulphur, or other metals or metalloids which are frequently found in wood, and which prove highly injurious in the manufacture of iron or other products made by the use of charcoal obtained therefrom.

My process is especially adapted to be used in conjunction with wood-distilling furnaces, in which the products of distillation are returned, after partial condensation, into the retort or into the fires, and thence into the retort—such as, for instance, that described in Letters Patent granted to me under date of October 8, 1878, No. 208,835; but it is obvious that some of the features can be advantageously used with any wood distilling or carbonizing device.

I wash the gaseous products of distillation, after their exit from the condensers, by passing them through an acid, preferably oxalic in solution, and through an alkaline solution, preferably caustic potash, the washing apparatus being introduced at any convenient points in the circulating-pipes. After this treatment the gases are conducted into a close receptacle containing the hot charcoal from a previous charge, through which they pass, and may then be driven either into the fires, or, after heating in pipes, into the retort. I have found that the admission of the washed gases, which consist, principally, of hydrocarbons, upon the charcoal renders the latter more dense, and facilitates the disengagement of any traces of metals or metalloids which may remain therein. The best effect is produced when the charcoal is hot, and, moreover, this accomplishes the double result of cooling the latter and reheating the gas prior to its entry into the fires or retort.

The foregoing process is described with special reference to the distillation of wood; but it may also be employed for peat, bagasse, or other substance capable of carbonization.

I am aware that it is not new to inject steam and carbonic-acid gas upon hot coke or charcoal for the purpose of quenching and cooling the charge, and I lay no claim to such treatment; nor do I here claim the process of distilling wood by admitting the hot products of distillation into a retort or kiln, the object of the present invention being to effect the absorption by the fresh charcoal of the enriching and purifying vapors—chiefly hydrocarbons—which remain after the washing and partial condensation of the distilled products.

I claim—

The process of removing deleterious substances from charcoal and rendering it more dense, which consists in washing the vapor of a distilling-charge of wood, as described, and subsequently forcing the gases remaining uncondensed upon a charge of heated charcoal, substantially as herein set forth.

JEAN ANTOINE MATHIEU.

Witnesses:
 WM. B. ROBINS,
 RICHARD S. HUNTER.